(12) United States Patent
Gallagher et al.

(10) Patent No.: US 11,032,413 B2
(45) Date of Patent: *Jun. 8, 2021

(54) ROBOCALL DETECTION

(71) Applicant: Soleo Communications, Inc, Victor, NY (US)

(72) Inventors: Daniel E. Gallagher, Fairport, NY (US); James J. Sonnick, Pittsford, NY (US); Michael G. Thorpe, Fairport, NY (US)

(73) Assignee: Soleo Communications, Inc., Victor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,995

(22) Filed: Feb. 21, 2020

(65) Prior Publication Data

US 2020/0195775 A1    Jun. 18, 2020

Related U.S. Application Data

(63) Continuation of application No. 16/159,056, filed on Oct. 12, 2018, now Pat. No. 10,582,041.

(60) Provisional application No. 62/572,267, filed on Oct. 13, 2017.

(51) Int. Cl.
*H04M 1/56* (2006.01)
*H04M 3/42* (2006.01)
*H04M 3/22* (2006.01)
*H04M 1/66* (2006.01)
*H04M 3/436* (2006.01)

(52) U.S. Cl.
CPC ........... *H04M 3/2281* (2013.01); *H04M 1/66* (2013.01); *H04M 3/436* (2013.01); *H04M 3/42059* (2013.01); *H04M 2203/556* (2013.01)

(58) Field of Classification Search
None
See application file for complete search history.

(56) References Cited

U.S. PATENT DOCUMENTS

| 9,071,683 B1* | 6/2015 | Somes | H04M 3/42059 |
| 10,582,041 B2* | 3/2020 | Gallagher | H04M 1/66 |
| 2011/0150193 A1* | 6/2011 | Cain | G06Q 30/02 379/88.22 |

(Continued)

FOREIGN PATENT DOCUMENTS

KR    20100002273    1/2010

OTHER PUBLICATIONS

Office Action for U.S. Appl. No. 16/159,056, dated Jun. 5, 2019, Gallagher, "Robocall Detection", 10 pages.

(Continued)

*Primary Examiner* — Quoc D Tran
(74) *Attorney, Agent, or Firm* — Lee & Hayes, P.C.

(57) ABSTRACT

Calls initiated from disconnected phone numbers and calls initiated from phone numbers that initiate calls to disconnected numbers can be indicative of robocalls. Disconnected numbers and phone numbers that have initiated calls to disconnected numbers are identified and assigned a robocall score that indicates a likelihood that a call initiated from that number is a robocall. A communication network that subscribes to a robocall detection service can request a robocall score associated with an originating number associated with a received call, and then handle the call according to the robocall score.

6 Claims, 4 Drawing Sheets

(56) References Cited

U.S. PATENT DOCUMENTS

| | | |
|---|---|---|
| 2011/0170680 A1 | 7/2011 | Chislett et al. |
| 2014/0119527 A1 | 5/2014 | Cohen |
| 2014/0128047 A1 | 5/2014 | Edwards et al. |
| 2015/0195403 A1 | 7/2015 | Goulet et al. |
| 2017/0048388 A1* | 2/2017 | Sharpe .................. H04M 3/436 |
| 2019/0116258 A1 | 4/2019 | Gallagher et al. |

OTHER PUBLICATIONS

The PCT Search Report and Written Opinion dated Feb. 8, 2019 for PCT Application No. PCT/US2018/055686, 12 pages.

* cited by examiner

ROBOCALL DETECTION

CROSS-REFERENCE TO RELATED APPLICATION

The present disclosure is a continuation of and claims priority to U.S. patent application Ser. No. 16/159,056, filed Oct. 12, 2018, which is a nonprovisional of and claims priority to U.S. Provisional Patent Application No. 62/572,267, filed Oct. 13, 2017, which are incorporated herein by reference.

BACKGROUND

Receipt of automated calls, also known as robocalls, is an increasing frustration for many phone users. Users can add their phone number to a national do-not-call registry, but many entities that conduct robocalls either don't consult the do-not-call registry or have found other ways around it. In many cases, robocallers hide their identity by spoofing the originating number to make it appear that a phone call is originating from another number, which may not even be associated with the entity making the call. For example, an entity will spoof their originating number to make it appear to a call recipient that a call is originating from a number that is local to the call recipient, regardless of where the call is actually originating from.

SUMMARY

Implementations described herein provide architecture and techniques for robocall detection. Phone numbers that are known to be disconnected are identified, analyzed, and assigned a robocall score indicating a likelihood that a call initiated from a particular number is potentially from a robocaller. Additionally, phone numbers that initiate calls to disconnected numbers are identified, analyzed, and assigned a robocall score indicating a likelihood that a call initiated from a particular number is potentially from a robocaller.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
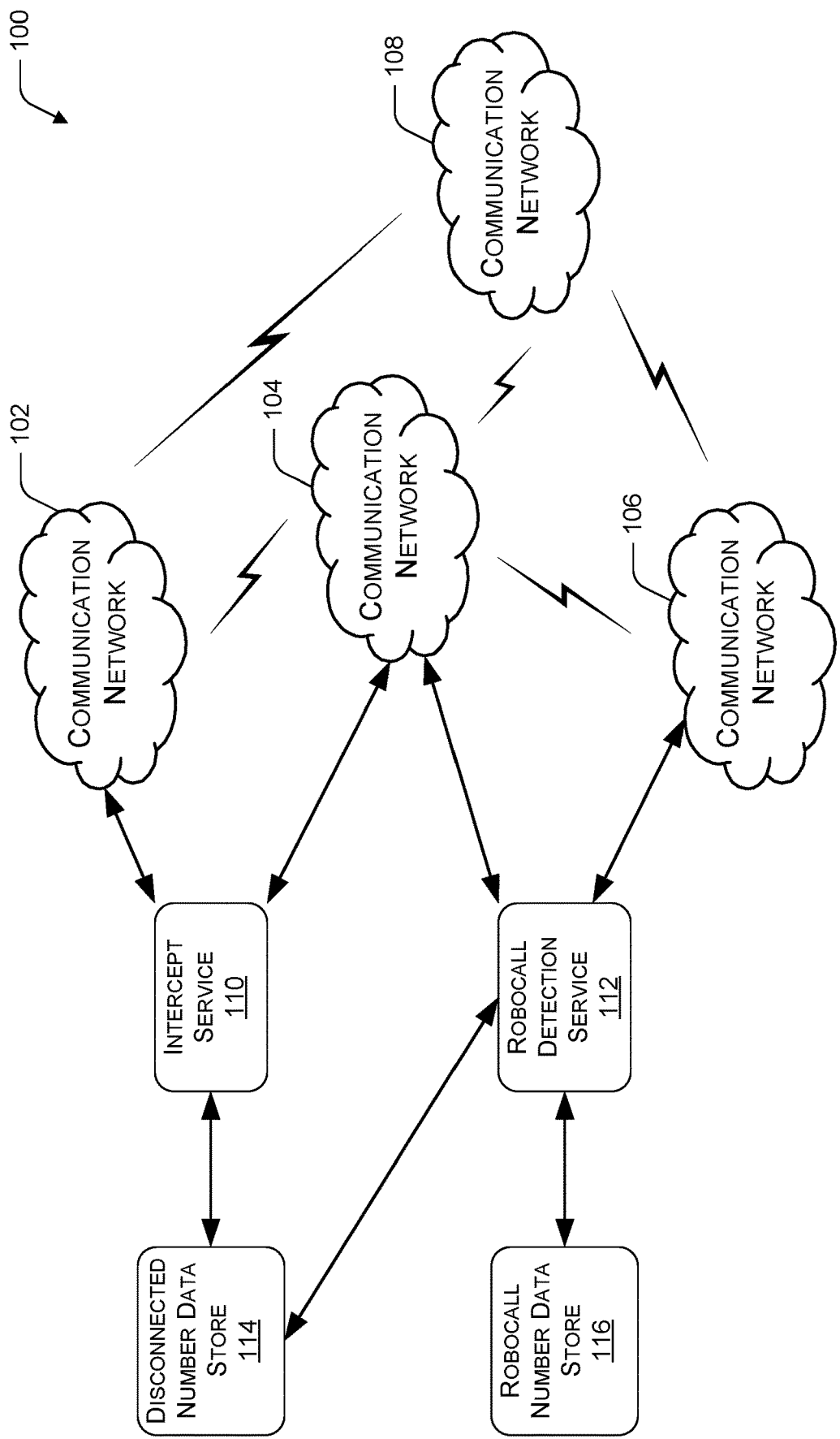
FIG. 1 is a block diagram illustrating an example environment in which robocall detection may be implemented, in accordance with various implementations.

Robocall detection, as described herein, enables a communication network to identify whether or not a particular call is likely being initiated by a robocaller. In the described implementations, data that is gathered in association with disconnected numbers is further analyzed to identify possible robocalls. For example, one or more communication networks may subscribe to a disconnected call intercept service, which may provide an informative message to a caller when the caller places a call to a disconnected number. For example, if a user places a call to a disconnected number that was previously associated with a plumbing business, rather than just notifying the caller that the number is disconnected, the call may be forwarded to an intercept service. The intercept service may then provide a more informative message (e.g., a list of one or more numbers for other plumbing business in the area) to the caller.

The intercept service maintains a list of numbers that are known to be disconnected. In an example implementation, the intercept service may receive from one or more communication networks, a list of one or more numbers that the communication networks know to be disconnected. For example, when a company goes out of business or a residential customer moves out of the area or otherwise cancels their service, those numbers may be added to a list that is sent to the intercept service. Alternatively, or in addition, the intercept service may identify a number as a disconnect number when the intercept service receives a call directed to the number. For example, a communication network may not provide a list of disconnected numbers to the intercept service, but instead, may just forward to the intercept service any received calls that are directed to disconnected numbers. In either case, the intercept service may maintain a data store of disconnected numbers. The intercept service may be available to multiple communication networks, and thus, the data store of disconnected numbers may include disconnected numbers that are associated with multiple communication networks.

The disconnected data store may maintain or store additional data associated with one or more disconnected numbers. For example, there may be numbers that are temporarily disconnected e.g., due to customer request or technical problems with the networks. Numbers that are known to be only temporarily disconnected may be stored in the disconnected number data store with a flag or other indication that the number is only temporarily disconnected.

The disconnected number data store may be updated periodically. Updates may occur in various ways. For example, a communication network may periodically provide updated data to the intercept service identifying, for example, newly disconnected numbers and/or previously disconnected numbers that have been put back in service. In alternate implementations, the disconnected number data store may be updated in other ways, for example, based on how recently a call directed to the disconnected number has been received by the intercept service or how long the number has been flagged as a disconnected number. For example, numbers that have been disconnected may be reused (reassigned to another user) after a few months of being disconnected. If the intercept service has recently received a call directed to a particular number, that number can be assumed to still be a disconnected number.

In an example implementation, when the intercept service receives a call, if the destination number is not already in the disconnected number data store, the destination number associated with the call is added to the disconnected number data store. In addition, the data store may record the number and the date that the call was received. The date represents the last time at which the number was known to be disconnected. The data store may also include a record of how many calls to the number have been intercepted, and may, in some instances, record a date of each intercepted call that is received.

An example robocall detection service accesses the data store of the intercept service to identify phone numbers that are known to be disconnected. Because these phone numbers are known to be disconnected, no outgoing calls should be initiated from these numbers. Accordingly, a communication network subscribed to the robocall detection service may send data to the robocall detection service when a call is placed or received. The robocall detection service compares an originating number associated with the phone call to the robocall detection service data store. If an originating number associated with a phone call is a known disconnected number, then the robocall detection service notifies the communication network that there is a high likelihood that the phone call is a robocall. The communication network can then handle the call according to rules or guidelines in place at the communication network related to handling of robocalls.

The intercept service may also identify originating phone numbers that initiate a large number of calls to disconnected numbers. Because robocallers frequently generate calls randomly, robocallers are more likely than legitimate callers to place a large number of calls to disconnected numbers. Accordingly, in an example implementation, the intercept service may store data that identifies originating phone numbers that place calls to disconnected numbers. This data is also accessible to the robocall detection service. In an example, when an originating phone number repeatedly places a number of calls to one or more disconnected numbers over time, that originating phone number may be flagged as likely being associated with a robocaller.

Because robocallers have the ability to spoof their originating number, there is a degree of uncertainty in flagging a particular originating number as a robocaller. In other words, a robocaller may spoof their originating number as a legitimate number. In this scenario, flagging that legitimate number as a robocaller could negatively impact the legitimate subscriber to whom that number is subscribed. In an example implementation, each number that is identified in the robocall detection data store has an associated score that indicates a likelihood that the number is a robocaller. Phone numbers that are known to be disconnected numbers may have a high score indicating a high likelihood that any phone call originating from that number is from a robocall, while numbers that have been identified as placing a threshold number of calls to disconnected numbers may have a lower score indicating a lower likelihood that any phone call originating from that number is from a robocall.

In an example implementation, the robocall detection service receives data associated with disconnected numbers and originating numbers that have placed calls to disconnected numbers. The data is received from the intercept service, which gathers data from multiple communication networks. The robocall detection service analyzes the received data to calculate a robocall score that indicates a likelihood that a call originating from a particular number is a robocall. Various factors, such as frequency of calls made or received, time of day at which calls are made, how recently calls have been made, how long a number has been disconnected, etc., may be considered in analyzing the data to generate the robocall scores. For example, a disconnected number that has placed multiple calls within the past hour may have a higher score than a disconnected number that last placed a call more than 24 hours earlier. As another example, a number that has placed one or more calls to a single disconnected number may be assigned a lower score than a number that has placed calls to multiple disconnected numbers. (For example, a disconnected number that was previously assigned to a fax machine may continue to receive calls from originating numbers that are trying to send a fax. Multiple calls to that disconnected number from a single originating number may not necessarily indicate that the originating number is a robocaller.) Also, a number that has placed only three calls to disconnected numbers within the past two hours may be assigned a lower score than a number that has placed 10 or more calls to disconnected numbers within the past two hours. Time of day may also be a factor in calculating a robocall score in that robocallers typically don't place calls in the middle of the night.

As described above, the intercept service aggregates data associated with disconnected numbers from multiple communication networks. This data is then provided to the robocall detection service. Accordingly, the robocall detection service generates robocall scores for numbers that are associated with multiple communication networks. Thus, the robocall detection service provides a more comprehensive service than one implemented for only a single communication network. Furthermore, communication networks that are subscribed to the robocall detection service do not have to be subscribed to the intercept service.

Illustrative Environment

FIG. 1 illustrates an example environment 100 in which robocall detection may be implemented. Example environment 100 includes one or more communication networks. In the illustrated example, communication networks 102, 104, 106, and 108 are each able to communicate with the others. Communication networks 102, 104, 106, and 108 represent wired telephone networks, wireless telephone networks, and IP networks that support Voice over Internet Protocol (VoIP). Each communication network may represent a different telephone carrier. Example environment 100 also includes intercept service 110 and robocall detection service 112. Any number of communication networks may subscribe to intercept service 110 and/or robocall detection service 112. In the illustrated example environment 100, communication network 102 and communication network 104 subscribe to intercept service 110, and communication network 104 and communication network 106 subscribe to robocall detection service 112. In the illustrated example environment 100, communication network 108 is not subscribed to either intercept service 110 or robocall detection service 112.

Intercept service 110 is implemented to handle calls directed to disconnected numbers. For example, when communication network 102 receives a call that has a destination number that is a disconnected number, the communication network 102 forwards the call to intercept service 110. Intercept service 110 handles the call according to predefined call handling preferences. For example, if the call is directed to a number that was previously associated with a business, intercept service 110 may provide a message to the caller with alternate numbers for similar businesses in the area. As another example, if the call is directed to a number that is temporarily disconnected, the intercept service 110 may provide a message to the caller indicating when the number is expected to be reconnected. In implementations, intercept service 110 maintains disconnected number data store 114, which stores records associated with numbers that are, or have been, disconnected. Disconnected number data store 114 aggregates disconnected number data from each communication network that is subscribed to the intercept service 110, which in the illustrated example environment 100 includes communication networks 102 and 104.

Robocall detection service 112 is implemented to identify phone numbers that are suspected of being associated with robocallers. In the illustrated example implementation of FIG. 1, robocall detection service 112 maintains robocall number data store 116. Robocall detection service 112 obtains data, at least in part, from disconnected number data store 114 that is maintained in association with intercept service 110. For example, robocall detection service 112 may receive a list of disconnected numbers from disconnected number data store 114, which includes data generated from communication network 102 and communication network 104. In an example implementation, intercept service 110 or disconnected number data store 114 may also be configured to provide to robocall detection service 112 originating numbers that have initiated calls to disconnected numbers.

The example environment 100 illustrated in FIG. 1 is merely one example implementation environment. Other environments are also considered. For example, robocall detection service 112 may be implemented in an environment that does not include intercept service 110. In such an implementation, robocall detection service 112 may receive data identifying disconnected numbers and/or numbers that have placed calls to disconnected numbers from other sources, such as, for example, directly from one or more communication networks, e.g., communication networks 102, 104, 106, and/or 108. As another example, robocall detection service 112 may be implemented as a component of, or in association with, a single communication network, providing robocall detection based on disconnected number data to only that single communication network.

In various implementations, robocall detection service 112 may receive data identifying disconnected numbers and/or numbers that have placed calls to disconnected numbers from any number of sources, which may be a single source or any number of distributed sources. Similarly, robocall detection service 112 may be implemented to provide robocall detection data to any number of entities, including, for example, one or more specific communication networks.

Example Computing Device

Figure 2:
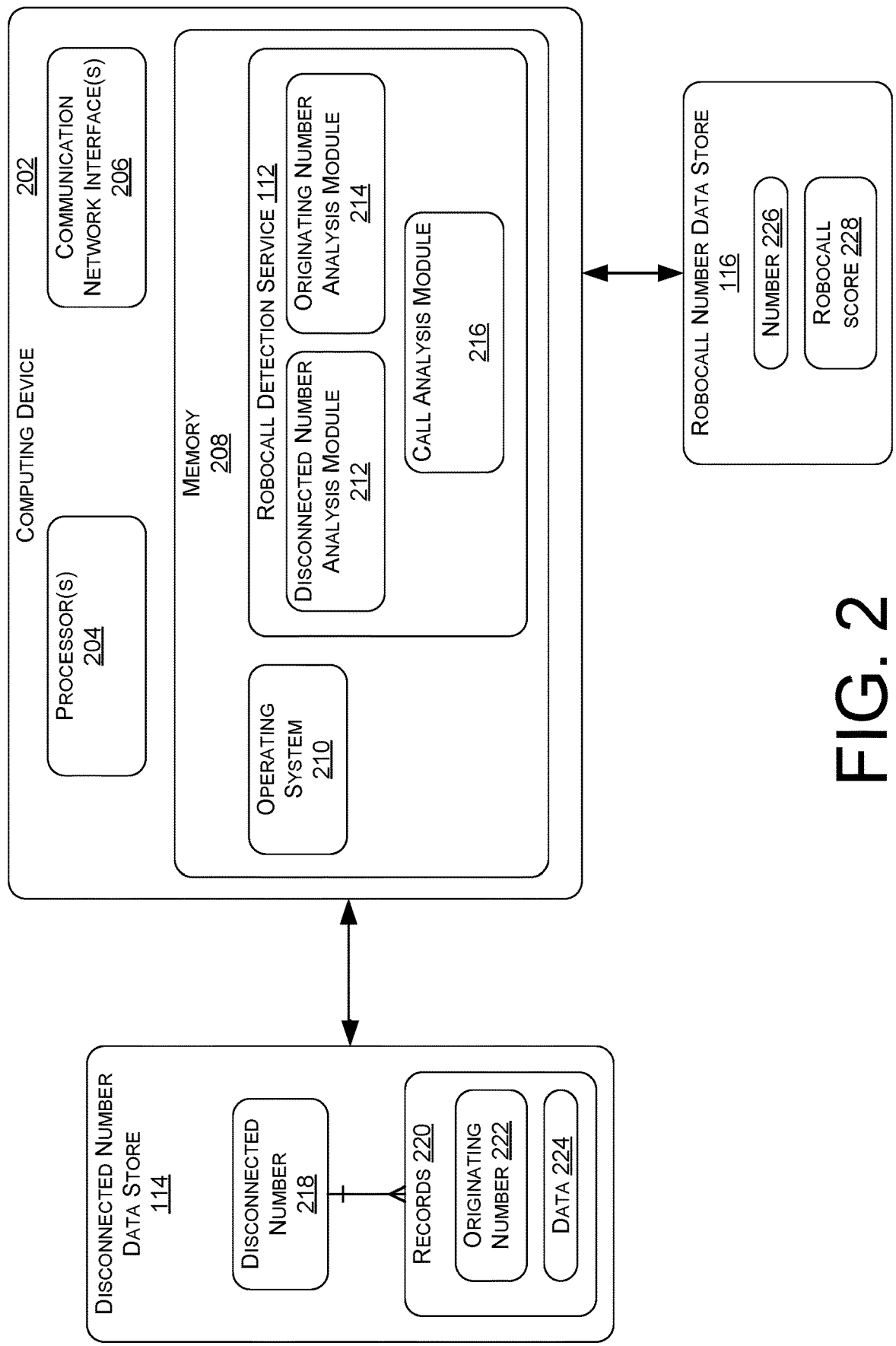
FIG. 2 is a block diagram illustrating select components of an example computing device implementing a robocall detection service, in accordance with various implementations.

FIG. 2 illustrates select components of an example computing device 202 implementing robocall detection service 112. Robocall detection service 112 may be implemented on a single computing device or may be distributed across multiple computing devices. Accordingly, example computing device 202 represents one or more computing devices over which robocall detection service 112 may be implemented.

Example computing device 202 includes one or more processors 204, one or more communication network interfaces 206, and memory 208. Processor(s) 204 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Communication network interface(s) 206 are configured to enable communications between computing device 202 and any number of communication networks.

Memory 208 is implemented as computer-readable media configured to store instructions executable by the processor 204. Memory 208 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Memory 208 is an example of computer storage media. Thus, the memory 208 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Executable instructions stored on memory 208 can include, for example, an operating system 210, robocall detection service 112, and any number of other modules, programs, or applications that are loadable and executable by processor 204.

Robocall detection service 112 includes disconnected number analysis module 212, originating number analysis module 214, and call analysis module 216. Disconnected number analysis module 212 is configured to receive and analyze data associated with disconnected phone numbers. For example, disconnected number data store 114 may be implemented to include one or more disconnected numbers 218. In various implementations, additional data may also be maintained in association with the disconnected numbers 218 (e.g., a flag indicating that the number is only temporarily disconnected). In the illustrated example, for each disconnected number 218, disconnected number data store 114 also stores any number of associated records 220 identifying an originating number 222 that initiated a call to the disconnected numbers 218 and data 224 such as, for example, a date/time of the call.

Robocall detection service 112 receives data 224 from disconnected number data store 114, analyzes the data, and for one or more numbers 226, calculates a robocall score 228 that indicates a likelihood that a call originating from a particular number 226 is a robocall. For example, numbers 226 that are known to be disconnected will likely have a high robocall score 228 because disconnected numbers should not be making any calls.

Originating number analysis module 214 is configured to receive data identifying originating numbers that have placed calls to disconnected numbers. For example, data 224 from records 220 may be received from disconnected number data store 114. Originating number analysis module 214 is configured to analyze the received data 224 and generate, for each originating number, a robocall score 228 that represents a likelihood that a call initiated by such an originating number is a robocall. Various factors may be considered in generating a robocall score 228 for such originating numbers that have placed calls to disconnected numbers, e.g., disconnected numbers 218. The various factors that may be included within the data 224 may include, for example, a number of distinct disconnected numbers to which calls have been placed, a frequency with which calls to such disconnected numbers have been made, times of day at which calls to disconnected numbers have been made, etc.

Call analysis module 216 is configured to receive, from a communication network, e.g., communication network 102, 104, 106, and/or 108 subscribed to robocall detection service 112, an originating number associated with a call. Call analysis module 216 may then correlate the originating number with a number 226 by querying the robocall number data store 116 for the originating number. If the originating number is stored in the robocall number data store 116 as a number 226, call analysis module 216 may then return to the communication network an indication of the robocall score 228 associated with the originating number in robocall number data store 116 based upon the corresponding number 226 in the robocall number data store 116. The communication network may then handle the call based on the received robocall score 228. For example, if an originating number has a high robocall score 228, the call may be terminated, if the originating number has a low robocall score 228, the call may be allowed to continue, and if the originating number has an intermediate robocall score 228, the call may be sent directly to voicemail. Any number of call handling procedures may be implemented by a communication network based, at least in part, on the provided robocall score 228.

FIG. 2 illustrates one example implementation of a computing device 202 configured to implement robocall detection service 112. In alternate example implementations, disconnected number data store 114 and robocall number data store 116 may be implemented as a single data store. Data in disconnected number data store 114 may be populated with data received from any number of sources including, for example, one or more communication networks or other sources that may provide a list of disconnected telephone numbers.

Example Methods for Robocall Detection

Figure 3:
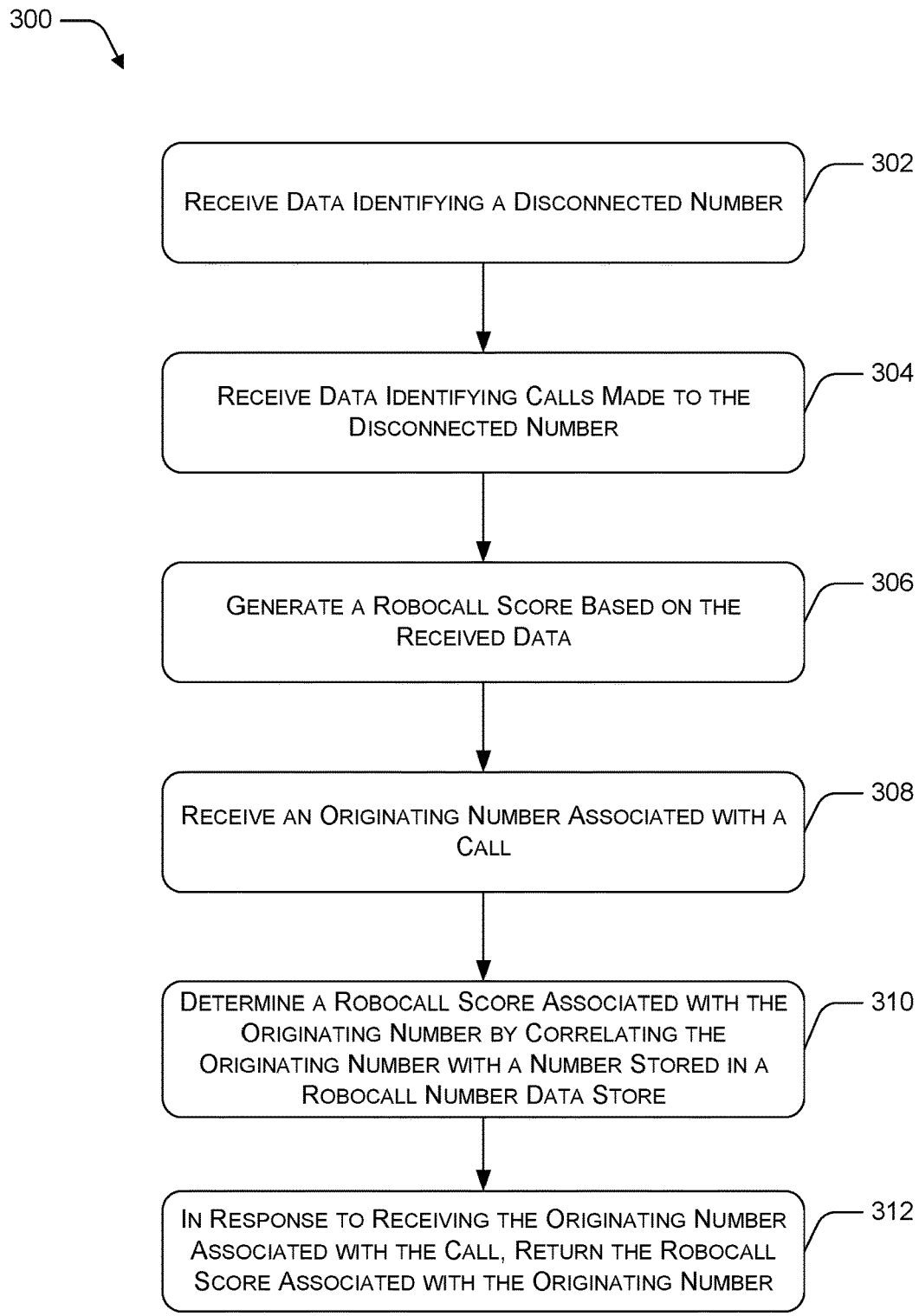
FIG. 3 is a flow diagram of an example method for robocall detection based on disconnected phone numbers, in accordance with various implementations.
Figure 4:
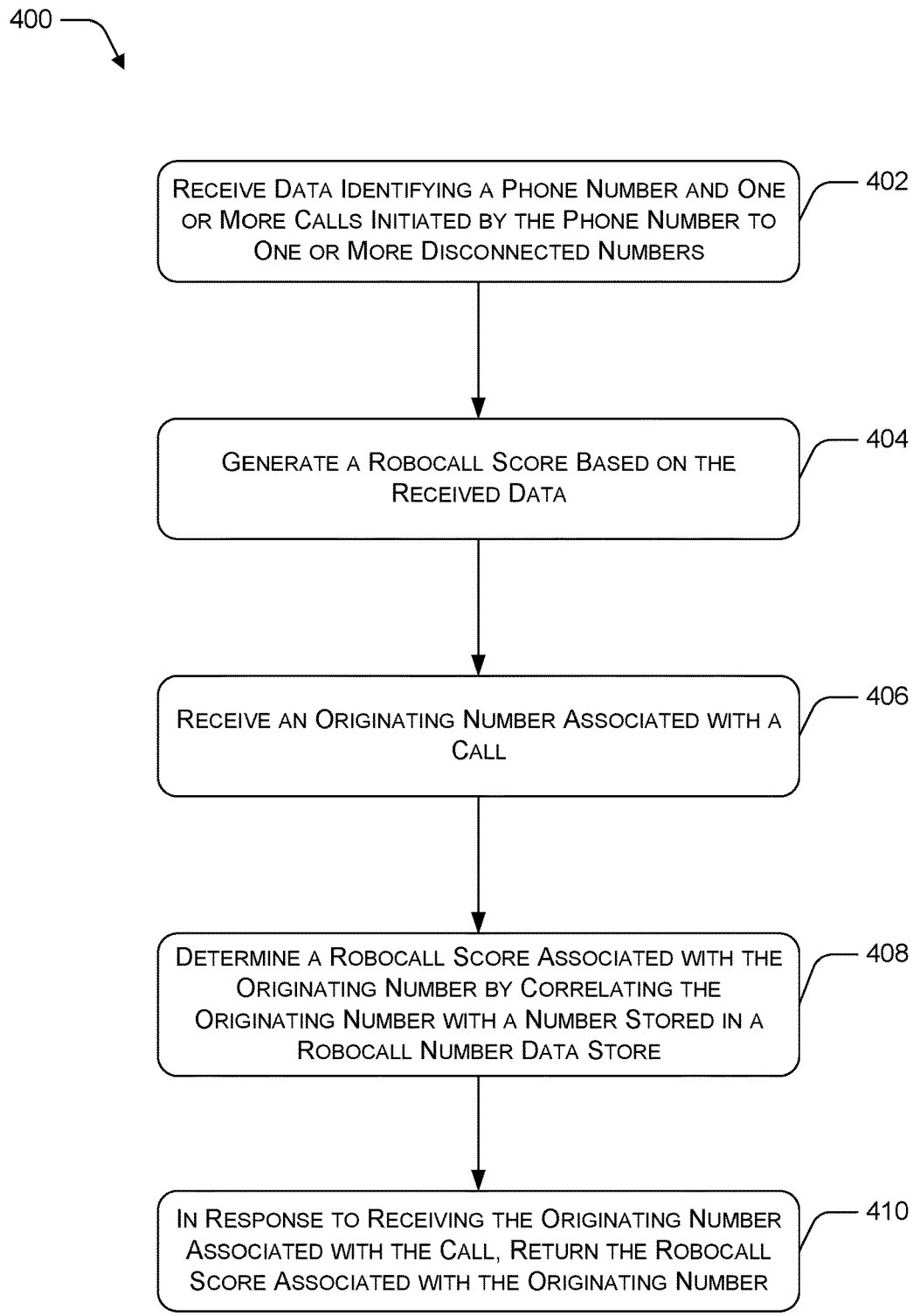
FIG. 4 is a flow diagram of an example method for robocall detection based on numbers that are identified as initiating calls to disconnected numbers, in accordance with various implementations.

FIGS. 3 and 4 illustrate example methods performed by robocall detection service 112. The example processes are illustrated as collections of blocks in logical flow graphs, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 3 illustrates an example method 300 for providing robocall scores based on data associated with disconnected phone numbers.

At block 302, data identifying a disconnected number is received. For example, disconnected number analysis module 212 receives from disconnected number data store 114 a disconnected number 218.

At block 304, data identifying calls made to the disconnected number is received. For example, disconnected number analysis module 212 receives from disconnected number data store 114 records 220 such originating numbers and call date/time for calls made to a particular disconnected number 218.

At block 306, a robocall score is generated based on the received data. For example, an algorithm may be used to generate a robocall score 228 based on some combination of a number of calls made to the disconnected number 218 over time, a most recent date/time at which a call was made to the disconnected number, an earliest date/time at which the number was identified as being disconnected, and so on. In an example implementation, disconnected number analysis module 212 causes the number to be stored as a number 226 along with the corresponding robocall score 228 to be stored (or updated) in robocall number data store 116.

At block 308, an originating number associated with a call is received. For example, communication network 104, which is subscribed to robocall detection service 112, receives a call, and sends the originating number associated with the call to robocall detection service 112.

At block 310, a robocall score associated with the received originating number is determined by correlating the received originating number with a number stored in a robocall number data store. For example, call analysis module 216 queries robocall number data store 116 to identify a robocall score 228 associated with the received originating number by correlating the received originating number with a number 226 stored in the robocall number data store 116.

At block 312, in response to receiving the originating number, the robocall score associated with the originating number is returned. For example, call analysis module 216 causes robocall detection service 112 to return the queried robocall score 228 to communication network 104 to enable communication network 104 to handle the call based, at least in part, on the robocall score 228 associated with the originating number.

FIG. 4 illustrates an example method 400 for providing robocall scores based on data associated with originating numbers that have placed calls to disconnected phone numbers.

At block 402, data is received identifying a phone number and one or more calls initiated by the phone number to one or more disconnected numbers. For example, originating number analysis module 214 receives from disconnected number data store 114 an originating number 222 and data 224 representing calls made by that number to disconnected numbers 218.

At block 404, a robocall score is generated based on the received data. For example, an algorithm may be used to generate a robocall score 228 based on some combination of a number of distinct disconnected numbers that have been called by the phone number, a number of calls to disconnected numbers made over time, a frequency of calls to disconnected numbers, a time of day at which a call was made to a disconnected number, etc. In an example implementation, originating number analysis module 214 causes the number to be stored as a number 226 along with the corresponding robocall score 228 to be stored (or updated) in robocall number data store 116.

At block 406, an originating number associated with a call is received. For example, communication network 104, which is subscribed to robocall detection service 112, receives a call, and sends the originating number associated with the call to robocall detection service 112.

At block 408, a robocall score associated with the received originating number is determined by correlating the received originating number with a number stored in a robocall number data store. For example, call analysis module 216 queries robocall number data store 116 to identify a robocall score 228 associated with the received originating number by correlating the received originating number with a number 226 stored in the robocall number data store 116.

At block 410, in response to receiving the originating number, the robocall score associated with the originating number is returned. For example, call analysis module 216 causes robocall detection service 112 to return the queried robocall score 228 to communication network 104 to enable the communication network 104 to handle the call based, at least in part, on the robocall score 228 associated with the originating number.

CONCLUSION

Although the techniques have been described in language specific to structural features and/or methodological acts, it is to be understood that the appended claims are not necessarily limited to the features or acts described. Rather, the features and acts are described as example implementations of such techniques.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving a first plurality of disconnected numbers associated with a first communication network;
receiving a second plurality of disconnected numbers associated with a second communication network;
storing the first plurality of disconnected numbers and the second plurality of disconnected numbers in a robocall detection data store;
receiving a plurality of originating phone numbers that have placed calls to at least one of (i) one or more disconnected numbers of the first plurality of disconnected numbers or (ii) one or more disconnected numbers of the second plurality of disconnected numbers;
storing the plurality of originating phone numbers in the robocall detection data store;
for individual originating phone numbers in the robocall detection data store, calculating a robocall score that represents a likelihood that a phone call initiated from a particular one of the plurality of originating phone numbers is a robocall; and
for individual disconnected numbers in the robocall detection data store, calculating a robocall score that represents a likelihood that a phone call initiated from a particular one of the disconnected numbers is a robocall.

2. A method as recited in claim 1, wherein:
a first subset of the plurality of originating phone numbers is associated with the first plurality of disconnected numbers; and
a second subset of the plurality of originating phone numbers is associated with the second plurality of disconnected numbers.

3. A system comprising:
a processor;
a memory communicatively coupled to the processor;
a robocall detection service stored in the memory and executed by the processor, the robocall detection service including:
a robocall number data store;
a disconnected number analysis module configured to:
determine a disconnected number;
analyze data associated with the disconnected number to generate a first robocall score, the first robocall score being associated with the disconnected number; and
store the disconnected number and the first robocall score in the robocall number data store;
an originating number analysis module configured to:
determine an originating number that has placed at least one call to a disconnected phone number of a plurality of disconnected numbers;
analyze data associated with the originating number to generate a second robocall score, the second robocall score being associated with the originating number; and
store the originating number and the second robocall score in the robocall number data store; and
a call analysis module configured to:
determine an initiating phone number associated with a phone call being handled by a communication network; and
in response to determining the initiating phone number, providing a robocall score associated with the initiating phone number in the robocall detection number data store.

4. A system as recited in claim 3, wherein the disconnected number analysis module is configured to determine the disconnected number by receiving the disconnected number from at least one of:
- a communication network; or
- an intercept service to which a communication network is subscribed.

5. A system as recited in claim 3, wherein the call analysis module is configured to determine the initiating phone number by:
- receiving the initiating phone number from a communication network; or
- receiving a phone call within a communication network.

6. A system as recited in claim 3, wherein the originating number analysis module is configured to determine the originating number by receiving the originating number from at least one of:
- a communication network; or
- an intercept service to which a communication network is subscribed.

\* \* \* \* \*